United States Patent
Strickroth

(10) Patent No.: US 10,016,723 B2
(45) Date of Patent: Jul. 10, 2018

(54) METHOD FOR THE CATALYTIC REMOVAL OF SULPHUR DIOXIDE FROM WASTE GASES

(71) Applicant: CPPE CARBON PROCESS & PLANT ENGINEERING S.A., Luxembourg-Dommeldange (LU)

(72) Inventor: Alain Strickroth, Esch/Alzette (LU)

(73) Assignee: CPPE CARBON PROCESS & PLANT ENGINEERING S.A., Luxembourg-Dommeldange (LU)

( * ) Notice: Subject to any disclaimer, the term of this patent is extended or adjusted under 35 U.S.C. 154(b) by 0 days.

(21) Appl. No.: 15/511,857

(22) PCT Filed: Sep. 16, 2015

(86) PCT No.: PCT/EP2015/071153
§ 371 (c)(1),
(2) Date: Mar. 16, 2017

(87) PCT Pub. No.: WO2016/042005
PCT Pub. Date: Mar. 24, 2016

(65) Prior Publication Data
US 2017/0252697 A1    Sep. 7, 2017

(30) Foreign Application Priority Data

Sep. 17, 2014 (LU) .................................. 92547

(51) Int. Cl.
*C01B 17/69* (2006.01)
*C01B 17/74* (2006.01)
(Continued)

(52) U.S. Cl.
CPC .......... *B01D 53/75* (2013.01); *B01D 53/507* (2013.01); *B01D 53/8609* (2013.01);
(Continued)

(58) Field of Classification Search
CPC .......... C01B 17/69; C01B 17/74; C01B 17/76
See application file for complete search history.

(56) References Cited

U.S. PATENT DOCUMENTS

| | | | |
|---|---|---|---|
| 3,436,192 A * | 4/1969 | Karlsson Per Hilmer ................... | B01D 53/50 208/150 |
| 3,862,295 A | 1/1975 | Tolles | |

(Continued)

FOREIGN PATENT DOCUMENTS

| CN | 1215628 A | 5/1999 |
|---|---|---|
| CN | 102380312 A | 3/2012 |

(Continued)

OTHER PUBLICATIONS

International Preliminary Report on Patentability dated Dec. 16, 2016 issued in corresponding International Application No. PCT/EP2015/071153.

(Continued)

*Primary Examiner* — Timothy C Vanoy
(74) *Attorney, Agent, or Firm* — Nath, Goldberg & Meyer; Jerald L. Meyer

(57) ABSTRACT

The present invention relates to a method for the catalytic removal of sulfur dioxide from waste gases in two reactors, wherein the first reactor is charged with an activated carbon catalyst. The method comprises:
a. provision of a waste gas with a water content of less than 1 g $H_2O/Nm^3$ and an $SO_2$ content of at least 5 ppm,
b. introduction of the waste gases into a first reactor,
c. catalytic conversion of the $SO_2$ into gaseous $SO_3$ in the first reactor by the activated carbon catalyst, wherein catalytic conversion on the activated carbon catalyst proceeds at a temperature of below 100° C.,
d. introduction of the prepurified waste gases from the first reactor into a second reactor,
e. conversion of the $SO_3$ with water into $H_2SO_4$ in the second reactor.

29 Claims, 5 Drawing Sheets

(51) Int. Cl.
  *C01B 17/76* (2006.01)
  *B01D 53/75* (2006.01)
  *B01D 53/50* (2006.01)
  *B01D 53/86* (2006.01)
  *C01B 17/765* (2006.01)
  *C01B 17/78* (2006.01)
  *C01B 17/80* (2006.01)

(52) U.S. Cl.
  CPC ............ *C01B 17/765* (2013.01); *C01B 17/78* (2013.01); *C01B 17/803* (2013.01); *B01D 2251/506* (2013.01); *B01D 2255/702* (2013.01)

(56) References Cited

U.S. PATENT DOCUMENTS

| | | | |
|---|---|---|---|
| 4,140,752 A | | 2/1979 | Ratcliffe et al. |
| 4,520,003 A | * | 5/1985 | Petersson ................ C01B 17/76 423/522 |
| 7,837,970 B2 | * | 11/2010 | Daum ..................... C01B 17/76 423/522 |
| 2004/0096390 A1 | | 5/2004 | Kobayashi et al. |

FOREIGN PATENT DOCUMENTS

| | | | | |
|---|---|---|---|---|
| CN | 102892484 A | 1/2013 | | |
| CN | 202898023 U | 4/2013 | | |
| CN | 103826726 A | 5/2014 | | |
| DE | 44 36 019 A1 | * 4/1996 | ........... | B01D 53/507 |
| EP | 0 367 998 A2 | 5/1990 | | |
| EP | 2330075 A | 6/2011 | | |
| EP | 2 404 654 A1 | 1/2012 | | |
| GB | 1 209 002 | 10/1970 | | |
| JP | 2000-93742 A | 4/2000 | | |
| WO | 85/04343 A1 | 10/1985 | | |

OTHER PUBLICATIONS

International Search Report dated Jan. 5, 2016 issued in corresponding International Application No. PCT/EP2015/071153.

Office Action dated Sep. 8, 2017 in corresponding the Chinese Patent Application No. 201580050536.7.

\* cited by examiner

METHOD FOR THE CATALYTIC REMOVAL OF SULPHUR DIOXIDE FROM WASTE GASES

This is a National Phase Application filed under 35 U.S.C. 371 as a national stage of PCT/EP2015/071153, filed Sep. 16, 2015, an application claiming the benefit of Luxembourg Application No. LU 92 547, filed Sep. 17, 2014, the content of each of which is hereby incorporated by reference in its entirety.

TECHNICAL FIELD

The present invention relates generally to a method for the catalytic removal of sulfur dioxide from waste gases.

BACKGROUND OF THE INVENTION

The early 20th century saw the development of the first methods for catalytically producing sulfuric acid from sulfur dioxide. These developments gave rise to the first "contact" plants in which highly concentrated (98-99%) sulfuric acid was produced. In a first step, $SO_2$ is oxidised to $SO_3$ at very high temperatures (300-500° C.) and in a second step $SO_3$ is converted into $H_2SO_4$ by addition of water at lower temperatures. These "contact" plants have changed only slightly in their manner of operation over the course of recent decades. One improvement was inter alia the introduction of the double contact plant which may in principle be regarded as two series-connected (single) contact plants. As a result, efficiency and thus conversion of $SO_2$ to $H_2SO_4$ have been increased to above 99%.

EP 2 404 654 A1 describes, for example, such a method in which $SO_2$ is converted in two stages into $H_2SO_4$ at high temperature (of 300° C. and 700° C.) and at high pressure (between 2 bar and 50 bar). Metal oxides are specifically stated as preferred catalysts.

Further plants which are the current state of the art are described for example in the document "Stand der Technik in der Schwefelsäureerzeugung im Hinblick auf die IPPC-Richtlinie" by Herbert Wiesenberger and Joachim Kircher, Umweltbundesamt GmbH, Vienna, 2001 or in Ullmann's Encyclopedia of Industrial Chemistry, 5th edition, volume A 25, pages 635 to 700.

The essential problems of these contact plants are:
1. The temperature differences for $SO_2/SO_3$ and $SO_3/H_2SO_4$ conversions and the associated emission limit exceedances when starting up the plant.
2. General corrosion of the plants due to the temperatures and $H_2SO_4$ concentrations involved and the associated poor reliability and rapid ageing of contact plants.
3. High capital costs in conjunction with high operating costs for catalyst replacement and repairs.
4. Contact plants require minimum $SO_2$ inlet concentrations of above 3 vol. %, below which $H_2SO_4$ conversion does not proceed.
5. Due to the nature of the system, the reactors consist of stainless steel because of the high catalysis temperatures and have a relatively large space requirement.

One parallel invention of interest was the SULFACID® method dating from the 1960s. In this method, $SO_2$ is oxidised to $SO_3$ on an activated carbon bed at ambient temperatures and converted on the same activated carbon bed into $H_2SO_4$ by simultaneous addition of water. A dilute acid (10-20%) can be produced in this manner. This is a wet method which is, however, only capable of converting $SO_2$ to $H_2SO_4$ to a limited extent. The $SO_2$ input concentration is of economic interest only up to approx. 2500 ppm, since the activated carbon layer thicknesses otherwise increase hugely and result in a large pressure drop. Moreover, as a consequence, the efficiency of a conventional SULFACID® plant remains relatively low (approx. 90-95%). Furthermore, the space requirement of such plants rises massively, as a result of which conventional Sulfacid® plants are disadvantageous from the standpoint of capital and operating costs. This fact becomes all the more marked, the larger are the plants in terms of volumetric flow rate.

In a number of methods, the catalytic removal of sulfur dioxide from waste gases is carried out in a reactor charged with activated carbon, wherein the catalyst is repeatedly washed with water or a hydrous solution and then redried.

The catalyst is exposed to $SO_2$ until the conversion of $SO_2$ drops, then the $SO_2$ feed is shut off and the catalyst exposed to water and the $H_2SO_4$ is washed out. The catalyst is then dried and may then be reused.

Such methods are known, for example, from U.S. Pat. No. 3,486,852; U.S. Pat. No. 4,122,150; U.S. Pat. No. 5,679,238 or U.S. Pat. No. 2012/251404 A1.

The disadvantage of these latter methods is that the catalyst must be repeatedly washed with water and then redried. A continuous method is thus not possible and at least two reactors must thus always be operated alternately.

Furthermore, only slightly concentrated sulfuric acid can be obtained by the above-stated method which must then either be dumped or alternatively highly concentrated in a costly manner before being offered for commercial sale.

OBJECT OF THE INVENTION

One object of the present invention is to provide a continuous method for removing $SO_2$ from waste gases at low temperatures.

GENERAL DESCRIPTION OF THE INVENTION

Said object is achieved according to the invention by a method for the catalytic removal of sulfur dioxide from waste gases in two reactors, wherein the first reactor is charged with an activated carbon catalyst. The method comprises the following steps:
  a. provision of a waste gas with a water content of less than 1 g $H_2O/Nm^3$ and an $SO_2$ content of at least 5 ppm,
  b. introduction of the waste gases into a first reactor,
  c. catalytic conversion of the $SO_2$ into gaseous $SO_3$ in the first reactor by the activated carbon catalyst, wherein catalytic conversion on the activated carbon catalyst proceeds at a temperature of below 100° C.,
  d. introduction of the prepurified waste gases from the first reactor into a second reactor,
  e. conversion of the $SO_3$ with water into $H_2SO_4$ in the second reactor.

The method operates reliably under any operating conditions.

The method makes it possible continuously to treat industrial plant waste gases primarily containing sulfur dioxide ($SO_2$) as pollutant and to remove all or a considerable proportion of this sulfur dioxide from the waste gases in a method and, in so doing, finally to convert it into liquid $H_2SO_4$.

In a first reactor, the dry waste gases are introduced into the reactor and the $SO_2$ is adsorbed onto the activated carbon catalyst and converted into $SO_3$. This catalytic conversion proceeds on an activated carbon catalyst at a temperature of below 100° C. Contrary to what has previously been assumed, however, it is not necessary to wash the $SO_3$ off the activated carbon catalyst. If the waste gases and the catalyst are dry, the sulfur dioxide is converted on the activated carbon catalyst into $SO_3$ and is then discharged again in gaseous form. The catalyst does not become saturated with $SO_3$, i.e. the activity of the activated carbon catalyst remains constant.

It is accordingly not necessary to rinse the activated carbon catalyst with water or an aqueous solution.

Only in a second reactor is the resultant gaseous $SO_3$ brought into contact with $H_2O$ and so converted into $H_2SO_4$.

This conversion of $SO_3$ into $H_2SO_4$ may be carried out by a known method. Very little water may be used for this purpose and it is thus possible to obtain a more highly concentrated acid than in the SULFACID method.

It should be noted that the waste gases to be treated must be dry, i.e. contain as little water as possible. The waste gases to be treated preferably contain at most 0.8 g water per $Nm^3$ waste gas, particularly preferably at most 0.7 g water per $Nm^3$ waste gas, and in particular at most 0.4 g water per $Nm^3$ waste gas. If the water content is too high or if the catalyst is moist, the resultant $SO_3$ is immediately converted into $H_2SO_4$ on the activated carbon catalyst and remains on the activated carbon catalyst. After some time, the activity of the activated carbon catalyst declines, i.e. $SO_2$ conversion declines.

A further advantage of this method is that the activated carbon catalyst lasts longer since it is no longer exposed to $H_2SO_4$ and also does not have to be alternately rinsed and dried.

A further advantage of this method is that waste gases with a concentration of up to 180,000 ppm $SO_2$, preferably at most 130,000 ppm, particularly preferably at most 110,000 ppm, and in particular at most 100,000 ppm can be treated. This method thus makes it possible to treat waste gases with a substantially lower pollutant concentration than the traditional contact methods and to treat waste gases with a substantially higher pollutant concentration than the traditional SULFACID method.

The inlet temperatures of the waste gases preferably lie between ambient temperature and 150° C. Higher continuous operating temperatures could permanently damage the catalyst. If need be, the activated carbon catalyst may be cooled, for example by mounting a cooling coil in the activated carbon catalyst in the reactor.

The gas pressure of the waste gases at the inlet to the first reactor is preferably between 800 and 1400 mbar, particularly preferably between 900 and 1100 mbar and in particular between 950 and 1050 mbar and thus relatively close to atmospheric pressure.

Since this method proceeds at low temperatures, the reactors need not consist of stainless steel, as for example is the case in the contact methods, but may instead be produced inexpensively from, for example, fibre glass.

In the method, at least 60 vol. % of the $SO_2$ present in the waste gases is converted, preferably at least 75 vol. %, particularly preferably at least 90 vol. % and in particular at least 98 vol. %.

The oxygen content of the waste gases is not actually critical, but should ideally be at least 2 vol. %, preferably at least 5 vol. %, particularly preferably at least 8 vol. %, and in particular at least 10 vol. %.

The $O_2$ content should preferably be more than 8 times higher than the $SO_2$ content.

The activated carbon catalyst preferably comprises a natural peat activated carbon or extruded wood activated carbon catalyst, for example: Norit-RST3, PK 2.5, Calgon Carbon—Centaur HSV, Jacobi-Ecosorb G-SWC80, VRX-Super, CPPE 25 or CPPE 30.

A further advantage of the method is that the resultant sulfuric acid may be highly concentrated, i.e. it is possible to obtain sulfuric acid with a concentration of at least 10 wt. %, preferably at least 50 wt. %, particularly preferably 70 wt. % and in particular at least 96 wt. %.

In a preferred embodiment, dilute sulfuric acid is used for the conversion of $SO_3$ into $H_2SO_4$.

The method may be carried out in a first reactor which comprises an activated carbon catalyst bed or a plurality of activated carbon catalyst beds connected in parallel or series.

BRIEF DESCRIPTION OF THE FIGURES

Further details and advantages of the invention may be inferred from the following detailed description of various possible embodiments of the invention made with reference to the appended figures, in which.

DESCRIPTION OF AN EMBODIMENT OF THE INVENTION

Figure 1:
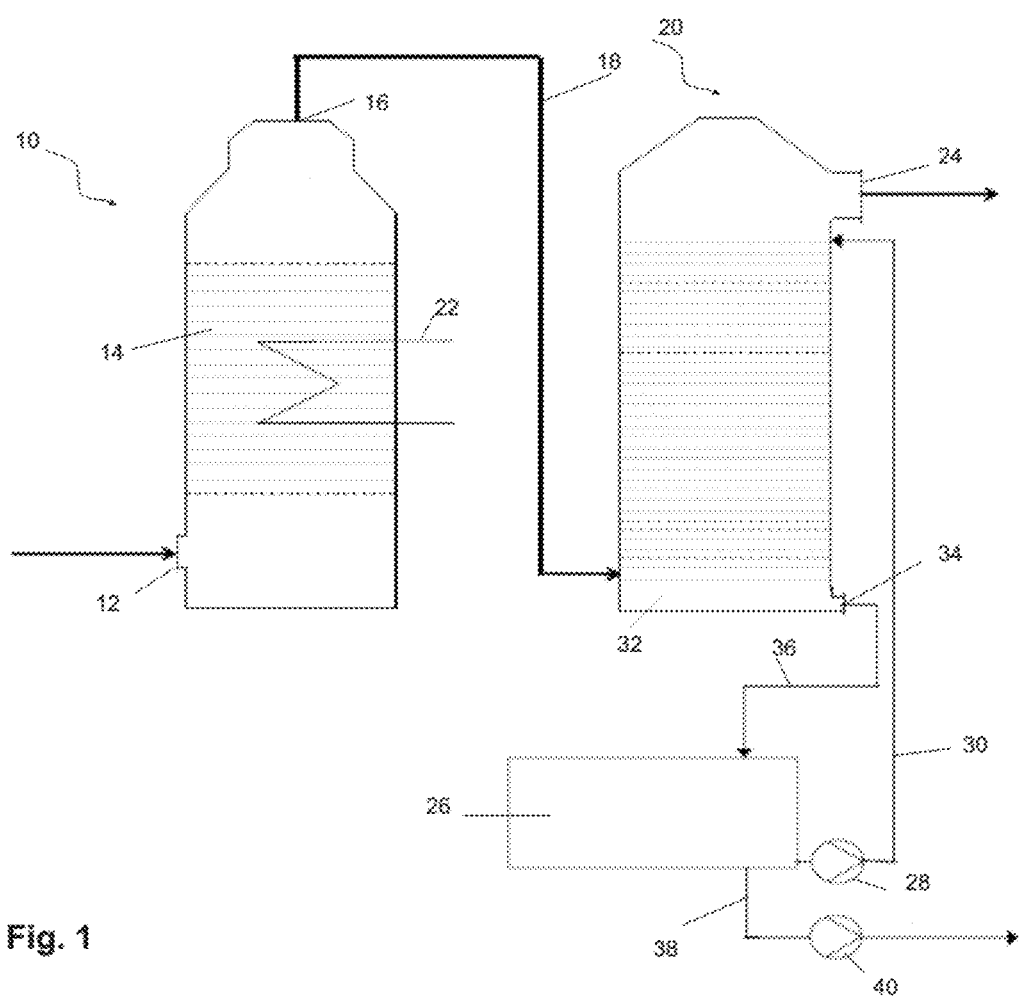
FIG. 1 is a schematic diagram of a first test arrangement.

The first test arrangement shown in FIG. 1 to illustrate the invention comprises a fixed-bed reactor 10, into the lower part of which is supplied an $SO_2$-containing waste gas via an inlet 12. The waste gas is passed from the bottom upwards through a fixed bed 14 with an activated carbon catalyst and is passed out of the upper part of the reactor 10 through an outlet 16 via a line 18 into an absorber 20.

In the fixed-bed reactor 10, the gaseous $SO_2$ is converted into gaseous $SO_3$ with the assistance of the activated carbon catalyst. In contrast with known methods, the $SO_3$ is not adsorbed onto the activated carbon catalyst and converted into $H_2SO_4$, but is instead released again in gaseous form after the reaction. The $SO_2$ is converted virtually 1:1, thus approximately 100%, into $SO_3$, i.e. $SO_2$ (almost) completely disappears from the waste gases and is replaced by the same quantity of $SO_3$.

A heating/cooling coil 22 is mounted in the fixed bed 14 in order to control the temperature in the fixed bed 14. Care is taken to ensure that the temperature in the fixed bed 14 does not exceed 100° C., in order to be gentle on the activated carbon catalyst and not unnecessarily shorten the service life thereof.

After leaving the fixed-bed reactor 10, the prepurified waste gases are passed into an absorber 20 where they are passed through a washing solution of 30-98% $H_2SO_4$. Preferably, 96% sulfuric acid is used. The prepurified waste gases are introduced via the line 18 into the lower region of the absorber 20 and rise through the liquid sulfuric acid and are then withdrawn as pure gas through an outlet 24 at the top of the absorber 20.

The gaseous $SO_3$ accordingly dissolves in the liquid sulfuric acid. As a result, disulfuric acid $H_2S_2O_7$ is quickly formed which reacts with the water present in the sulfuric acid to form $H_2SO_4$. This is a conventional method for converting $SO_3$ into $H_2SO_4$.

Liquid, dilute sulfuric acid from a tank 26 is introduced into the top region of the absorber 20 via a pump 28 and through a line 30. The sulfuric acid is discharged from the bottom 32 of the absorber 20 and flows via an outlet 34 and a line 36 back into the tank 26.

The sulfuric acid obtained may be pumped out of the tank 26 via a further line 38 with a pump 40. In this method, the sulfuric acid is thus concentrated because the water dissolved in the sulfuric acid is gradually consumed in order to convert $SO_3$ into $H_2SO_4$. Once the sulfuric acid in the tank 26 has reached the desired concentration, some of it is pumped out and appropriately replaced by water/dilute sulfuric acid.

Figure 2:
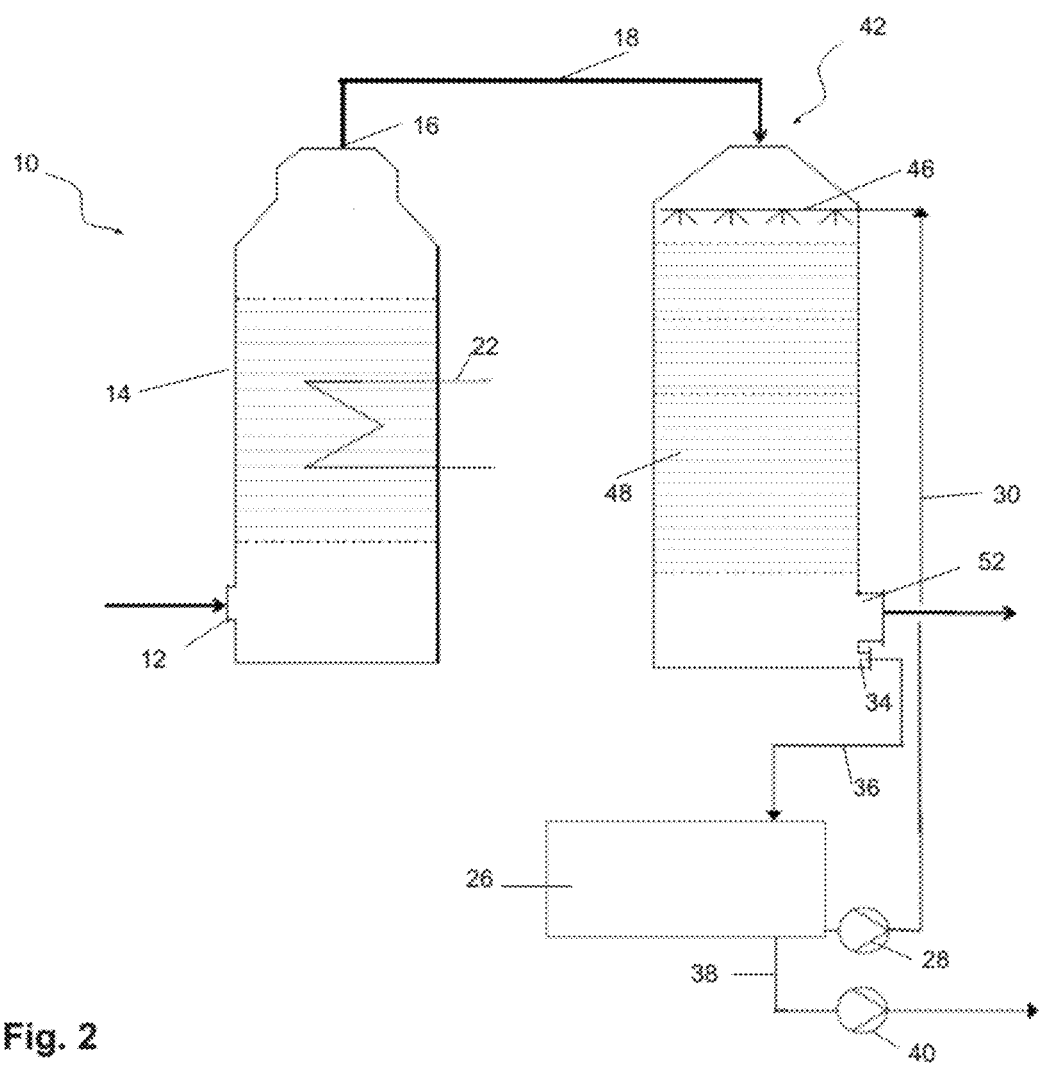
FIG. 2 is a schematic diagram of a second test arrangement.
Figure 3:
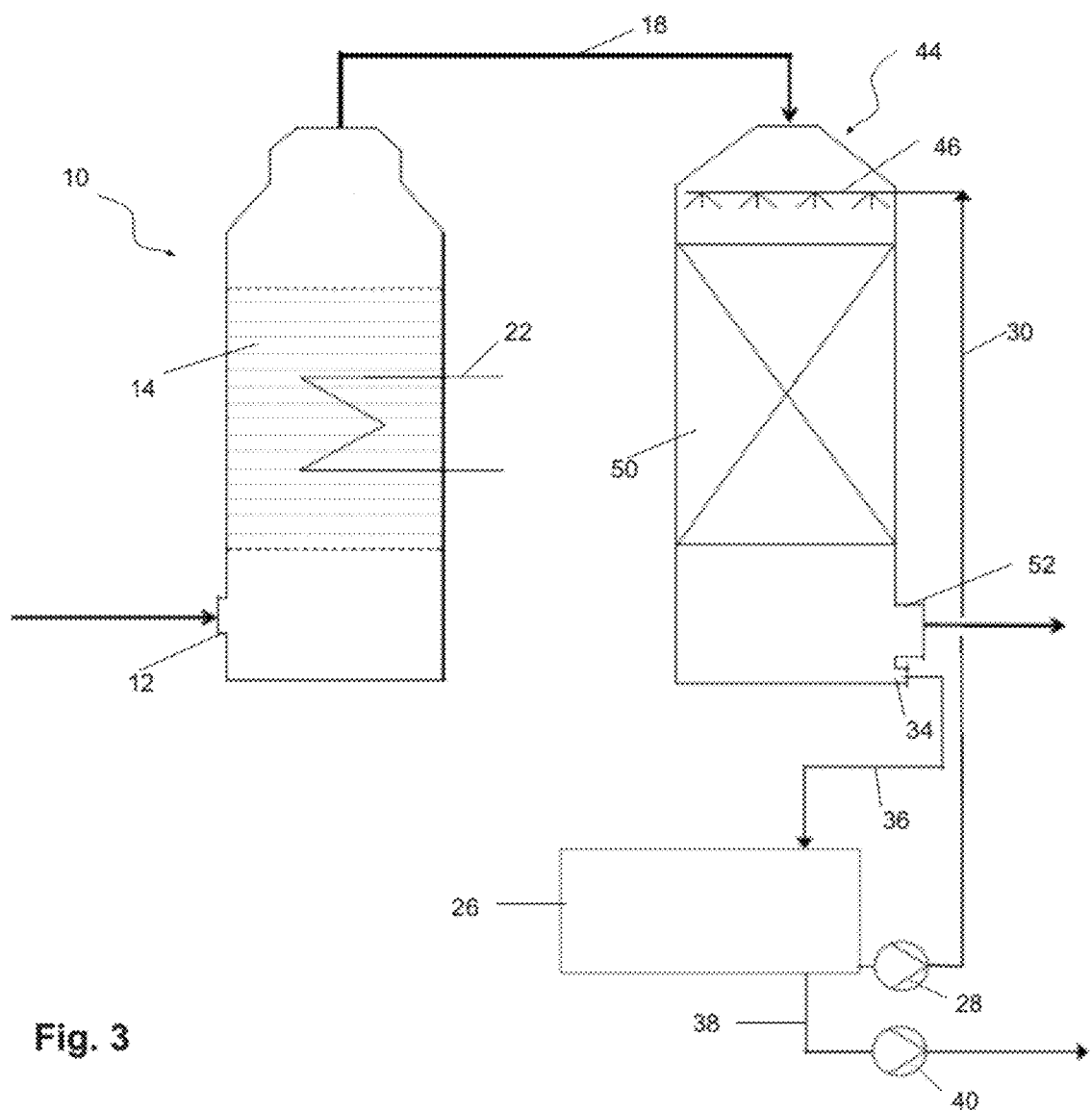
FIG. 3 is a schematic diagram of a third test arrangement.

The test arrangements shown in FIGS. 2 and 3 differ from the test arrangement of FIG. 1 in that the absorber 20, as a second reactor, is replaced by a separator 42 (FIG. 2) or by a SULFACID reactor 44 (FIG. 3). Both reactors 42, 44 are filled with solids. The separator 42 of FIG. 2 contains a fixed bed of plastic packing 48 (example: VFF Acidur® special stoneware) while the SULFACID reactor 44 contains a fixed bed of activated carbon 50.

In the case of these reactors 42, 44, the prepurified waste gas from the first reactor 10 is passed into the top region of reactors 42, 44. In this case too, the dilute sulfuric acid from tank 26 is introduced via a pump 28 through a line 30 into the top region of the separator 42 or of the SULFACID reactor 44. In these two embodiments, a spray device 46 is mounted in the top region of the separator 42 or of the SULFACID reactor 44, by means of which a uniform distribution of the dilute sulfuric acid onto the plastic packing 48 of the separator 42 or onto the activated carbon 50 of the SULFACID reactor 44 is achieved.

Unlike in FIG. 1, the prepurified waste gas is brought not countercurrently but instead cocurrently into contact with the dilute sulfuric acid. The prepurified waste gas is accordingly introduced via a line 18 into the top region of the separator 42 or of the SULFACID reactor 44 and, after the reaction, drawn off as pure gas through an outlet 52 in the lower region of the separator 42 or of the SULFACID reactor 44.

In these reactors 42, 44, the gaseous $SO_3$ is again dissolved in the liquid sulfuric acid. As a result, disulfuric acid $H_2S_2O_7$ is quickly formed which reacts with the water present in the sulfuric acid to form $H_2SO_4$.

Figure 4:
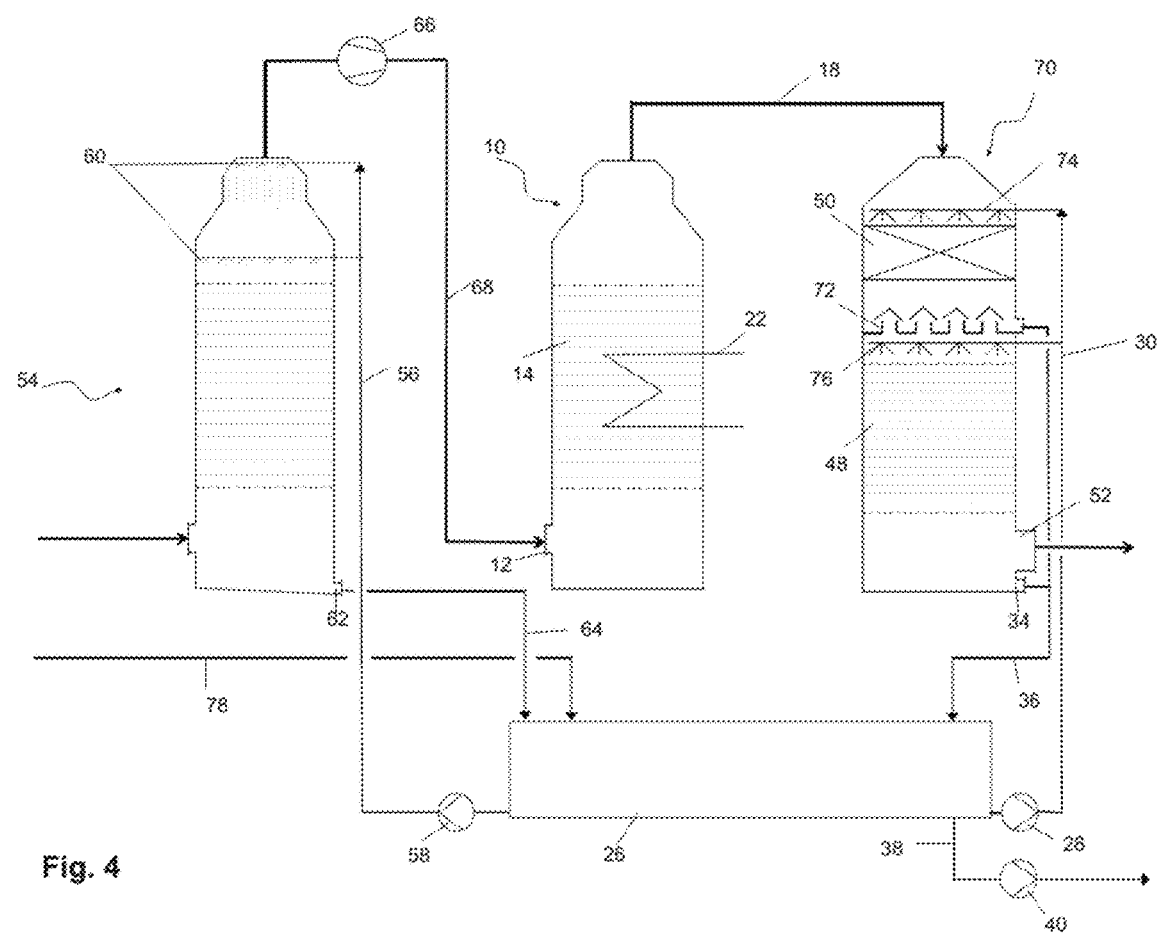
FIG. 4 is a schematic diagram of a fourth test arrangement.

FIG. 4 now shows a somewhat more complex test setup in which the reactor 10 corresponds to the reactors 10 in the previous figures. In this test arrangement, the $SO_2$-containing waste gases are dried in a drying tower 54 before being introduced into the reactor 10.

The structure of the drying tower 54 broadly corresponds to that of the absorber 20 of FIG. 1. Said drying tower 54 is, however, located upstream of the reactor 10 and serves to remove water from the $SO_2$-containing waste gases before they arrive in the reactor 10.

The $SO_2$-containing waste gases are accordingly introduced into the lower region of the drying tower 54 where they are dried countercurrently with sulfuric acid. The sulfuric acid with a concentration of 30 wt. % to 98 wt. % from the tank 26 is introduced into the top region of the drying tower 54 via a line 56, a pump 58 and spray devices 60.

Once the sulfuric acid has removed the water from the $SO_2$-containing waste gases, it is passed via a line 64 from the bottom of the drying tower 54 through an outlet 62 back into the tank 26.

The $SO_2$-containing waste gases dried in the drying tower 54 are drawn off from the top region of the drying tower 54 and introduced via a blower 66 and a line 68 through the inlet 12 into the lower region of the reactor 10.

In the fixed-bed reactor 10, the gaseous $SO_2$ is converted into gaseous $SO_3$ with the assistance of the activated carbon catalyst. A heating/cooling coil 22 is mounted in the fixed bed 14 of the reactor 10 in order to control the temperature in the fixed bed 14.

After leaving the fixed-bed reactor 14, the prepurified waste gases i.e. $SO_3$-containing waste gases are introduced into the top region of a reactor 70 where they are passed cocurrently through a washing solution of 30-98% $H_2SO_4$. Preferably, 96% sulfuric acid is used. After the reaction, the cleaned waste gas is drawn off as clean gas from the reactor 70 through an outlet 52 in the lower region.

The reactor 70 here comprises two zones one on top of the other, a SULFACID reactor 44 being arranged in the upper zone and a separator 42 in the lower zone. The two zones are separated from one another by a drop catcher 72.

Sulfuric acid from the tank 26 is passed through a line via a pump 28 to a spray device 74 which is located above the SULFACID reactor, whereby the sulfuric acid trickles through the activated carbon bed of the SULFACID reactor and absorbs the $SO_3$ dissolved in the waste gas and converts it into sulfuric acid. The concentrated sulfuric acid collects on the drop catcher 72 from where it is passed back into the tank 26.

Furthermore, sulfuric acid from the tank 26 is sprayed via the same pump 28 and the same line 30 beneath the droplet separator onto the separator bed through a further spray device 76. The remaining $SO_3$ present in the waste gas is then absorbed within the separator by the sulfuric acid and converted into sulfuric acid by reaction with the water dissolved in the sulfuric acid. The sulfuric acid is then passed through the outlet 34 in the bottom of the reactor 70 through the line 36 back into the tank 26.

Once the sulfuric acid in the tank 36 has reached the desired concentration, some of it is pumped out of the tank via the line 38 and the pump 40 and appropriately replaced by water/dilute sulfuric acid which is supplied by the line 76.

Figure 5:
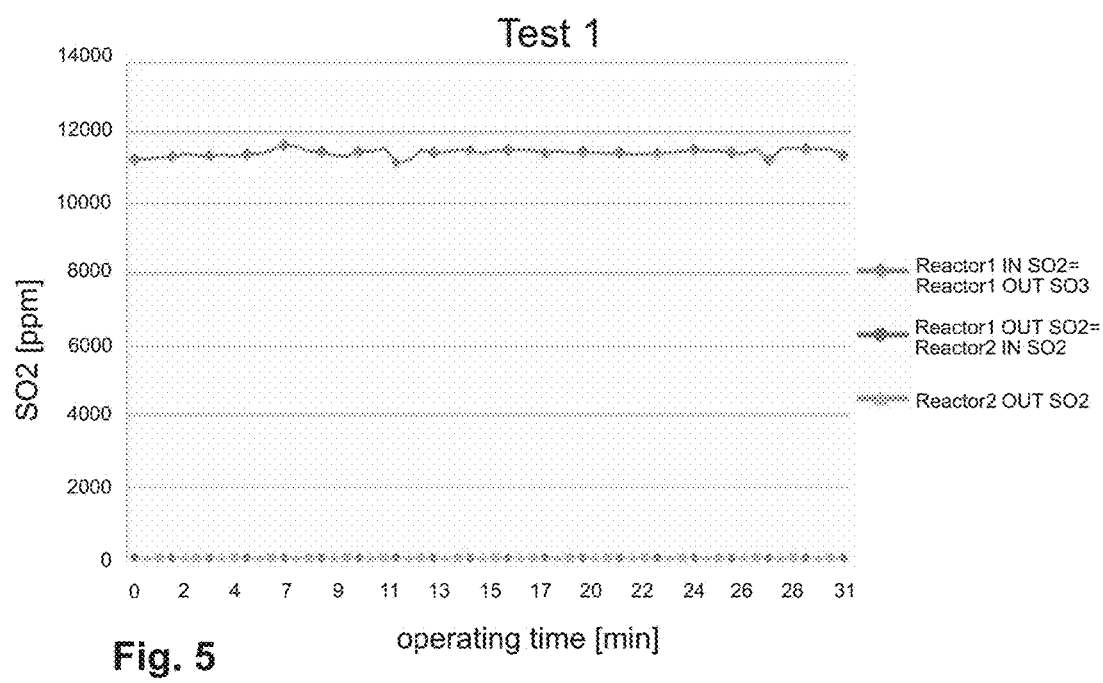
FIG. 5 and FIG. 6 are graphs showing the values, measured during testing, for the $SO_2$ content of the waste gases on entering and leaving the reactor.

FIG. 5 shows results from a first test series in which a flue gas from a contact plant with a water content of less than 0.2 g $H_2O/Nm^3$ and an $SO_2$ content of between 11000 and 12000 ppm $SO_2$ was treated in a plant with two reactors as shown in FIG. 3.

In the first reactor made from a glass fibre reinforced plastic, which had a volume of 3 $m^3$ and was provided with a fixed bed of 2 $m^3$ of Norit-RST3, PK 2.5, Calgon Carbon—Centaur HSV, Jacobi-Ecosorb G-SWC80, VRX-Super, CPPE 25 or CPPE 30 activated carbon catalyst, the $SO_2$ was completely converted into gaseous $SO_3$.

These catalysts are activated carbon pellets or shaped carbon, with a grain size between 1 and 3 mm, between 2 and 4 mm or between 3 and 5 mm and were produced by steam activation. The following general properties are guaranteed by the manufacturer: iodine number 800; methylene blue adsorption 11 g/100 g; internal surface area (BET) 875 $m^2/g$; bulk density 260 kg/$m^3$; density after back-wash 230 kg/$m^3$; uniformity factor 1.3; ash content 7 wt. %; pH alkaline; moisture (packed) 2 wt. %.

The temperature of the waste gases was between 20° C. and 30° C. at the inlet and between 20° C. and 30° C. at the outlet of the first reactor.

The waste gases treated in this manner were then passed into a second reactor. The second reactor was a SULFACID reactor which had a volume 2 $m^3$ and was filled with 1 $m^3$ of Norit-RST3, PK 2.5, Calgon Carbon—Centaur HSV, Jacobi-Ecosorb G-SWC80, VRX-Super, CPPE 25 or CPPE 30 brand activated carbon.

These catalysts are activated carbon pellets or shaped carbon with a grain size of between 1 and 3 mm, between 2 and 4 mm or between 3 and 5 mm and were produced by steam activation. The following general properties are guaranteed by the manufacturer: iodine number 800; methylene blue adsorption 11 g/100 g; internal surface area (BET) 875 m$^2$/g; bulk density 260 kg/m$^3$; density after back-wash 230 kg/m$^3$; uniformity factor 1.3; ash content 7 wt. %; pH alkaline; moisture (packed) 2 wt. %

The activated carbon in the second reactor was sprayed every 15 minutes with 25 l of sulfuric acid of a concentration of 1000 g/l.

This test series lasted approximately 30 minutes and approximately 150 Nm$^3$ of waste gases were treated.

Figure 6:
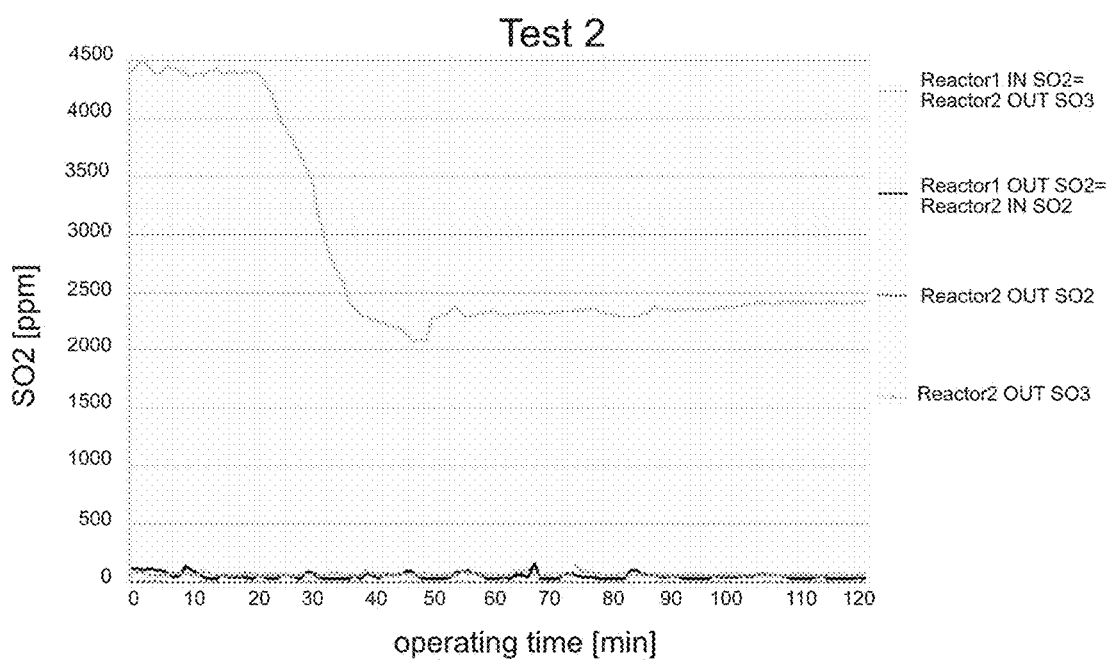

FIG. 6 shows results from a second test series in the same plant as the first test series.

$SO_2$-containing waste gases from the same contact plant as in the first test series were used in this test series. The $SO_2$ content of the waste gases was, however, lower (between 4500 ppm and 2500 ppm).

The test lasted approximately 120 minutes and approximately 600 Nm$^3$ of waste gases were treated.

Testo brand flue gas analysers were used in the tests. The analysers are of a recent generation (year of manufacture 2009) and were calibrated by the manufacturer. The analytical data from these flue gas analysers were moreover confirmed by wet chemical measurements carried out in parallel. The results for all the measurements were within admissible deviation tolerances.

These two tests revealed that the $SO_2$ from the waste gases was (almost) completely converted into $SO_3$ in the first reactor and the $SO_3$ was (almost) completely converted into $H_2SO_4$ only in the second reactor.

Thanks to the rapid and complete conversion of gaseous $SO_2$ into gaseous $SO_3$ in the first reactor, the activated carbon catalyst in the first reactor was not saturated.

Key to drawings:

10 Reactor
12 Inlet
14 Fixed bed
16 Outlet
18 Line
20 Absorber
22 Heating/cooling coil
24 Outlet
26 Tank
28 Pump
30 Line
32 Bottom
34 Outlet
36 Line
38 Line
40 Pump
42 Separator
44 SULFACID reactor
46 Spray device
48 Plastic packing
50 Activated carbon
52 Outlet
54 Drying tower
56 Line
58 Pump
60 Spray devices
62 Outlet
64 Line
66 Blower Key to drawings:

68 Line
70 Reactor
72 Drop catcher
74 Spray device
76 Spray device
78 Spray device

The invention claimed is:

1. A method for the catalytic removal of sulfur dioxide from waste gases in two reactors, the first reactor being charged with an activated carbon catalyst, comprising the following steps:
   a. providing a waste gas with a water content of less than 1 g $H_2O$/Nm$^3$ and an $SO_2$ content of at least 5 ppm,
   b. introducing the waste gases into a first reactor,
   c. catalytic converting the $SO_2$ into gaseous $SO_3$ in the first reactor by the activated carbon catalyst, wherein the catalytic conversion on the activated carbon catalyst proceeds at a temperature of below 100° C.,
   d. introducing of the prepurified waste gases from the first reactor into a second reactor,
   e. converting of the $SO_3$ with water into $H_2SO_4$ in the second reactor.

2. The method according to claim 1, wherein the waste gases to be treated contain at most 0.8 g water per Nm$^3$ waste gas.

3. The method according to claim 2, wherein the waste gases to be treated contain at most 0.7 g water per Nm$^3$ waste gas.

4. The method according to claim 2, wherein the waste gases to be treated contain at most 0.4 g water per Nm$^3$ waste gas.

5. The method according to claim 1, wherein the $SO_2$ content of the waste gases amounts to at most 180,000 ppm.

6. The method according to claim 5, wherein the $SO_2$ content of the waste gases amounts to at most 130,000 ppm.

7. The method according to claim 5, wherein the $SO_2$ content of the waste gases amounts to at most 110,000 ppm.

8. The method according to claim 1, wherein the inlet temperature of the waste gases is between ambient temperature and 150° C.

9. The method according to claim 1, wherein the gas pressure of the waste gases at the inlet to the first reactor is between 800 and 1400 mbar.

10. The method according to claim 1, wherein at least 60 vol. % of the $SO_2$ present in the waste gases is converted.

11. The method according to claim 10, wherein at least 75 vol. % of the $SO_2$ present in the waste gases is converted.

12. The method according to claim 10, wherein at least 90 vol. % of the $SO_2$ present in the waste gases is converted.

13. The method according to claim 10, wherein at least 98 vol. % of the $SO_2$ present in the waste gases is converted.

14. The method according to claim 1, wherein the $O_2$ content of the waste gases amounts to at least 2 vol. %.

15. The method according to claim 14, wherein the $O_2$ content of the waste gases amounts to at least 5 vol. %.

16. The method according to claim 14, wherein the $O_2$ content of the waste gases amounts to at least 8 vol. %.

17. The method according to claim 14, wherein the $O_2$ content of the waste gases amounts to at least 10 vol. %.

18. The method according to claim 14, wherein the $O_2$ content of the waste gases amounts to at least 5 vol. %.

19. The method according to claim 18, wherein the $O_2$ content of the waste gases amounts to at least 8 vol. %.

20. The method according to claim 19, wherein the $O_2$ content of the waste gases amounts to at least 10 vol. %.

21. The method according to claim 1, wherein the $O_2$ content is more than 8 times higher than the $SO_2$ content.

22. The method according to claim 1, wherein the activated carbon catalyst is a natural peat activated carbon catalyst or an extruded wood activated carbon catalyst.

23. The method according to claim 1, wherein an $H_2SO_4$ acid of at least 10 wt. % is discharged.

24. The method according to claim 23, wherein an $H_2SO_4$ acid of at least 50 wt. % is discharged.

25. The method according to claim 23, wherein an $H_2SO_4$ acid of at least 70 wt. % is discharged.

26. The method according to claim 23, wherein an $H_2SO_4$ acid of at least 96 wt. % is discharged.

27. The method according to claim 1, wherein the method is carried out in a first reactor which comprises an activated carbon catalyst bed.

28. The method according to claim 1, wherein the method is carried out in a first reactor which comprises a plurality of activated carbon catalyst beds connected in parallel.

29. The method according to claim 1, wherein the method is carried out in a first reactor which comprises a plurality of activated carbon catalyst beds connected in series.

* * * * *